United States Patent [19]

Fong et al.

[11] Patent Number: 4,734,103

[45] Date of Patent: Mar. 29, 1988

[54] VISCOSITY/DRAG REDUCING ADDITIVE FOR HIGH SOLIDS BLACK LIQUOR

[75] Inventors: Dodd W. Fong, Naperville; Daniel V. Diep, Aurora; Ralph W. Kaesler, Barrington, all of Ill.

[73] Assignee: Nalco Chemical Company, Naperville, Ill.

[21] Appl. No.: 76,440

[22] Filed: Jul. 22, 1987

[51] Int. Cl.$^4$ .............................. C10L 1/24; C10L 1/32
[52] U.S. Cl. ................................ 44/51; 162/30.1; 162/30.11
[58] Field of Search ................. 162/30.1, 30.11, 163; 110/342, 343; 44/51, 62, 76

[56] References Cited

U.S. PATENT DOCUMENTS

| | | | |
|---|---|---|---|
| Re. 28,474 | 12/1983 | Anderson et al. | 523/336 |
| Re. 28,576 | 12/1983 | Anderson et al. | 223/336 |
| 3,284,393 | 11/1966 | Vanderhoff et al. | 524/801 |
| 3,516,910 | 6/1970 | Engman et al. | 162/30.1 |
| 3,524,682 | 8/1970 | Booth | 241/15 |
| 3,826,632 | 7/1974 | Morgan et al. | 162/30.1 |
| 4,255,309 | 3/1981 | Klaessig et al. | 162/30.1 |

OTHER PUBLICATIONS

Tappi Monograph Series No. 32, edited by Kay P. Whitney, "Chemical Recovery in Alkaline Pulping Processes", Mask Printing Co., Easton, PA 19868.

Primary Examiner—S. Leon Bashore
Assistant Examiner—K. M. Hastings
Attorney, Agent, or Firm—John G. Premo; Anthony L. Cupoli; Donald G. Epple

[57] ABSTRACT

A high solids black liquor having the property of reduced turbulent flow/drag comprising a high solids black liquor which contains a few parts per million of a water soluble terpolymer containing the repeating units in the following mole percentages:

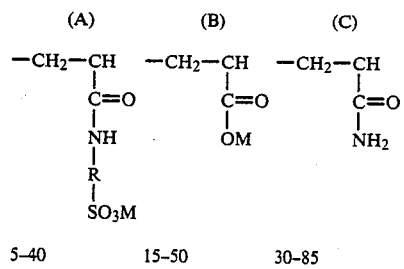

wherein R is a lower alkyl group from 1–6 carbon atoms, M is H or alkali metal, said terpolymer having a Reduced Specific Viscosity of at least 25.

2 Claims, 1 Drawing Figure

BLACK LIQUOR DRAG TEST RIG

VISCOSITY/DRAG REDUCING ADDITIVE FOR HIGH SOLIDS BLACK LIQUOR

INTRODUCTION

Black liquor, as is well known to those skilled in the papermaking art by alkaline pulping processes, is the spent cooking liquor from the digesters plus the filtrate from the washing operation. It is concentrated first in a multiple effect evaporator, next in a cascade or cyclone evaporator (a direct heat transfer device), then further concentrated by adding thereto a salt cake makeup and collected dust from the flue gas and hoppers, and finally heated prior to firing in the furnace. Inorganic components (sodium salts) in the concentrated black liquor are recovered in this burning operation as molten ash or smelt for reuse in the cooking liquor. Since all of these operations are well known in the art, a discussion thereof will not be repeated here. For a detailed description of these processes, reference may be made to Tappi Monograph Series No. 32 edited by Roy P. Whitney, "Chemical Recovery in Alkaline Pulping Processes", Mack Printing Co., Easton, Pa., 19868, particularly chapters 2 and 3 thereof.

As heretofore practiced, however, operations involving concentration (particularly if the concentrate so produced has a high solids content), chemical recovery, and burning of black liquor have presented certain practical difficulties. For example, when attempts have been made to operate a cascade or cyclone evaporator so as to produce a black liquor having a solids content greater than 60%, the results have generally been an increase in powder required for rotating the tubular elements of the evaporator and ultimately severe plugging of the furnace nozzles. From the evaporator, the heavy black liquor is fed into the furnace or combustion chamber which is perhaps the most important single piece of equipment in the entire recovery unit.

Energy saving, safety, and abatement of pollution can be best improved for boiler operation by firing a more concentrated liquor in the recovery boilers. However, the main limiting factor for burning high solids content liquor is its viscosity or flow friction (drag) which can cause pluggage of the liquor transport lines, the spray nozzles, and decrease in a capacity of the pumps.

It has been found that a small amount of high molecular weight acrylic acid-acyrylamide-sulfo lower alkyl acrylamide polymer added to the high solids black liquor (60% solids or higher) can greatly improve its flow without any major modification of the black liquor feed system.

The phenomenon of turbulent flow/drag reduction can be identified as an increase in the volumetric flow rate at a given pressure drop or a decrease in pressure drop at a given flow rate.

THE INVENTION

The invention is a high solids black liquor having the property of reduced turbulent flow/drag comprising a high solids black liquor which contains a few parts per million of a water soluble terpolymer containing the repeating units in the following mole percentages:

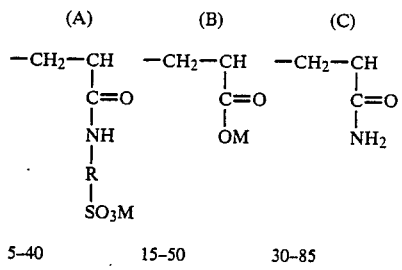

wherein R is a lower alkylene group from 1–6 carbon atoms. R is preferably ethylene. M is H, NH$_4$ or alkali metal, said terpolymer having a Reduced Specific Viscosity of at least 25.

THE WATER-SOLUBLE TERPOLYMERS

These terpolymers, having the above described formula, preferably contain between 10–30 mole percent by weight of (A), 20–30 mole percent of (B), and 30–70% of (C). These polymers, to give the best results, should have a RSV (Reduced Specific Viscosity determined in 1N NaNO$_3$ at a concentration of 0.045 g of polymer as the sodium salt per 100 cc) of at least 25 and preferably at least 30.

The polymers are used at a dosage of a few parts per million which is defined, as used herein, as being a general dosage of 3–1,000 parts per million and preferably 5–200 parts per million.

The term "concentrated black liquor" as used herein and in the claims has a solid content of at least 60% by weight.

PREPARATION OF THE POLYMERS

Figure 1:
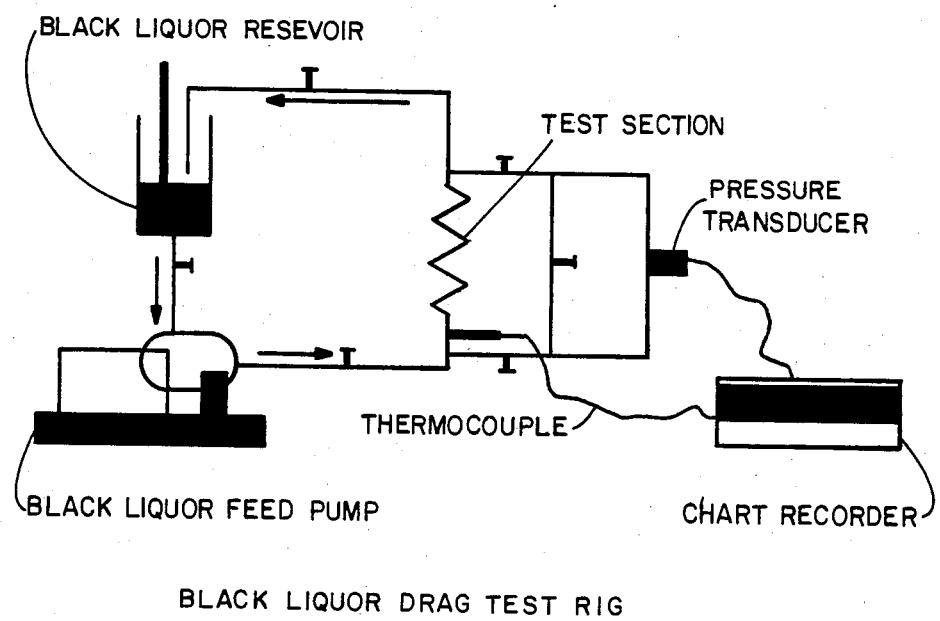
FIG. 1 is a black liquor drag test rig.

The chemical reaction which is preferred to obtain the sulfonated polymers of this invention is a reaction which can generally be referred to as a transamidation reaction. This reaction substitutes an amine compound which may also contain other functional groups such as the sulfonate function group for the nitrogen portion of a pendant amide group contained on a polymeric backbone as described above. This transamidation reaction has been discovered to be a general reaction which can achieve the substitution of the amine and sulfonate containing moiety for the amide nitrogen group of the pendant amide functionally of a water-soluble polymer, thereby obtaining sulfonated polymers.

The reaction conditions require that polymers containing pendant amide groups be dissolved or readily dispersed in a solvent which is a common solvent for the chemical reactant of the class described above. In other words, both the polymer which is to be modified and the chemical reactant should be soluble or dispersible in the same solvent system.

Common solvents which have been found useful in this reaction include, but are not limited to, water, dimethylformamide, dimethylsulfoxide, admixtures thereof, and admixtures of these solvents, either singly or taken together with other miscible solvents such as ethanol, tertiary butanol and the like.

A preferred solvent which is a common solvent for both the polymer containing pendant amide groups and the chemical reactants above is water, particularly if the polymer containing pendant amide group is initially water-soluble, as in the case of most acrylamide containing vinylic polymers. Another preferred common solvent for my reaction is a water-in-oil emulsion wherein the dispersed water phase contains dissolved therein both the polymers containing pendant amide groups and the chemical reactants described above.

After having dissolved the polymers containing pendant amide groups in the common solvent, preferably water, the chemical reactant can be added to obtain a solution or dispersion of amide containing polymer and the chemical reactants of this invention. Whether the polymer or the reactant is first added to the common solvent is of no consequence. This admixture is then added to or contained in reaction vessel capable of withstanding a pressurized chemical reaction, for example, a Paar Bomb type of vessel. The vessel is enclosed and then heated to a temperature of at least 100° C., preferably at least 110° C., and most preferably to a temperature of at least 120° C. If the temperature is increased above 100° C., the vessel contents can expand and the pressure within the vessel can exceed one atmosphere and depending upon the solvent, the sulfonates used or the reactants used, can reach up to about 5 to 15 atmospheres, and possibly more. The pressure within the reaction vessel is a non-controlled variable and is controlled only to the extent that the vessel is enclosed, that a reaction temperature of at least 100° C. or higher is reached, and the vessel may contain solvents or reactants of more or less volatile nature, which solvents and reactants have vapor pressures of such a nature that pressure vessels are required at temperatures above 100° C.

Once the reaction vessel contents have reached at least 100° C., and preferably 110° C., the reaction is allowed to occur for at least 3 minutes at this temperature, and preferably for whatever length of time is necessary to accomplish a minimum of at least a 25 percent conversion of the added amount of chemical reactant. The chemical reactant is, of course, converted to a pendant sulfonate containing substituted amide being the product of the transamidation chemical reaction summarized above. If the polymer is a homopolymer of acrylamide or a copolymer of vinyl amide containing monomers such that no other pendant functional group is present besides amide functional groups, the condition of the reaction is such that at least some degree of amide hydrolysis may also occur in those reactions in which water or a water containing solvent is utilized. In such cases, a carboxylate functional group is also obtained in addition to the sulfonate modified amide and any unreacted starting amide groups from the starting polymer.

The preferred aminoalkyl sulfonate starting ingredient to produce the preferred polymer is taurine. This produces a sulfonated monomer portion of the polymer having the structure

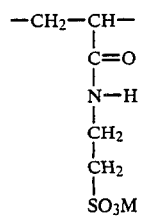

In order to evaluate the polymers of the invention, the following test method was used. The terpolymers tested were in the form of water-in-oil emulsions that contained 27–28% weight polymer. For more details with respect to the manufacture and use of latex from water-in-oil emulsion polymers of this type, see U.S. Pat. Nos. 3,284,393, RE 28,474 and RE 28,576.

TEST METHODS

A. Brookfield and Haake Viscometers

The viscometers measure viscosity by measuring the force required to rotate a spindle in the fluid. Testing procedures can be found in the manufacturers' instruction manuals.

B. Drag Reducing Test Rig

The test was designed to simulate the flow of black liquor with regard to the liquor temperature, pressure drop across the test section, and the liquor concentration. This laboratory friction loop produced the differential pressure between the inlet and outlet of a flowing black liquor in the small diameter (⅛" tube) stainless steel tube.

Drag reduction is measured as the percentage difference between a pressure without a drag reduction additive (100% friction) vs. the liquor's pressure measurement with additives. The apparatus consists of four main parts (see FIG. 1):

black liquor pump
test section
pressure transducer/recorder
black liquor reservoir/temperature controller Liquor was heated to the operating temperature (200°–260° F.) by the electric heated tapes wrapping around the feed line. Liquor pressure drops (18–25 psi) were obtained by adjusting the liquor flow as well as its temperature. Pressure drops of the blank and treated samples were measured after the steady state condition which is a condition of constant liquor temperature and pressure. The results of viscosity and drag reduction are tabulated in Table I, II and III.

TABLE I

| | Brookfield Viscosities and Viscosity Reduction of Black Liquor at 190° F. | | | | |
|---|---|---|---|---|---|
| Polymer | Polymer Composition Mole % $SO_3^-$ $CO_2^-$/$CONH_2$ | RSV of Polymer | Dosage Based on Black Liquor PPM | Brookfield Viscosity, CPS | % Reduction in Brookfield Viscosity |
| Blank | — | — | — | 66 | — |
| 1 | 10/31/59 | 48.6 | 63 | 28 | 41–58 |
| 1 | 10/31/59 | 48.6 | 6.3 | 53 | 20 |
| 2 | 26/26/48 | 35.5 | 63 | — | 47 |
| 3 | 42/13/45 | ~30 | 63 | — | 26 |

TABLE II

Haake Viscosities of Black Liquor at 220° F.

| Polymer | Polymer Composition Mole % $SO_3^-/CO_2^-/CONH_2$ | RSV of Polymer | Dosage PPM | Viscosity CPS |
|---|---|---|---|---|
| Blank | — | | | 151 |
| 4 | 0/0/100 | 25.4 | 63 | 173 |
| 5 | 2/23/75 | 56.1 | 63 | 177 |
| 6 | 10/31/59 | 48.6 | 63 | 137 |
| 2 | 26/26/48 | 35.5 | 63 | 131 |

TABLE III

Drag Reduction of Black Liquor in the Presence of Additives at 235° F.

| Polymer | Polymer Composition Mole % $SO_3^-/CO_2^-/CONH_2$ | RSV of Polymer | Dosage PPM | % Drag Reduction |
|---|---|---|---|---|
| 7 | 10/36/54 | 47.5 | 30 | 19 |
|   |          |      | 40 | 29 |
|   |          |      | 50 | 37 |
| 8 | 20/43/36 | ~33  | 40 | 21 |
|   |          |      | 50 | 25 |
|   |          |      | 30 | 17 |

What is claimed is:

1. A high solids black liquor having the property of reduced turbulent flow/drag comprising a high solids black liquor which has a solid content of at least 60% by weight and which contains a few parts per million of a water soluble terpolymer containing the following repeating units in the following mole percentages:

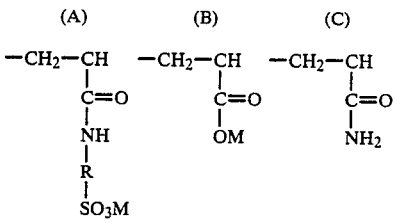

| (A) | (B) | (C) |
|---|---|---|
| 5–40% | 15–50% | 30–85% | wherein R is a lower alkyl group having from 1-6 carbon atoms, M is H, $NH_4$ or alkali metal, said terpolymer having a Reduced Specific Viscosity of at least 25, said terpolymer being present in an amount sufficient to reduce the viscosity of the black liquor.

2. The high solids black liquor of claim 1 wherein the mole percentages of the repeating units of the terpolymer are:
(A) 10–30%, (B) 20–30% and (C) 30–70%.

* * * * *